United States Patent
Wang

(10) Patent No.: US 7,241,367 B1
(45) Date of Patent: Jul. 10, 2007

(54) PERMEABLE MEMBRANE DIAPHRAGM OF DIFFERENT LAYERS FOR ELECTROYTIC CELLS

(75) Inventor: Guocheng Wang, Harbin (CN)

(73) Assignee: Harbin Huaer Chemical Company, Ltd., Harbin (CN)

( * ) Notice: Subject to any disclaimer, the term of this patent is extended or adjusted under 35 U.S.C. 154(b) by 0 days.

(21) Appl. No.: 09/889,574

(22) PCT Filed: Jan. 21, 2000

(86) PCT No.: PCT/CN00/00011

§ 371 (c)(1),
(2), (4) Date: Jan. 29, 2004

(87) PCT Pub. No.: WO00/46425

PCT Pub. Date: Aug. 10, 2000

(30) Foreign Application Priority Data

Feb. 2, 1999 (CN) ................. 99 2 02911

(51) Int. Cl.
*C25B 13/04* (2006.01)
(52) U.S. Cl. ............ 204/296; 521/27; 210/500.1; 210/500.36; 210/500.38
(58) Field of Classification Search ........... 204/296; 429/38, 39, 249, 250; 521/27; 210/500.1, 210/500.36, 500.38
See application file for complete search history.

(56) References Cited

U.S. PATENT DOCUMENTS 4,921,587 A * 5/1990 Dong et al. ............. 205/466
5,183,545 A * 2/1993 Branca et al. ........... 204/252

* cited by examiner

*Primary Examiner*—Bruce F. Bell
(74) *Attorney, Agent, or Firm*—Davidson, Davidson and Kappel, LLC

(57) ABSTRACT

The present invention relates to a permeable membrane diaphragm of different layers for electrolytic cell, especially for chloro-alkali electrolytic cell. The diaphragm is asymmetric, which comprises at least two layers: a flow-controlling permeable layer comprising micro-porous fluoropolymer, especially PTFE, and a diffusion-restricting permeable layer comprising porous film, sheet or cloth made of anti-corrosive materials, preferably polypropylene. The flow-controlling layer is mounted near the anode, and the diffusion-restricting layer is mounted near the cathode. The mean pore diameter of the diffusion-restricting layer is at least 5 times more than that of the flow-controlling layer and the thickness of the diffusion-restricting layer is at least 1 times more than that of the flow-controlling layer. The pore diameter of said flow-controlling layer ranges from 0.1–2.0 µm, and its thickness is 0.03–0.2 mm. The pore diameter of said diffusion-restricting layer ranges from 5–50 µm, and its thickness is 0.3–2 mm. The above two layers can also be made of more than one similar thinner membranes respectively.

8 Claims, 1 Drawing Sheet

PERMEABLE MEMBRANE DIAPHRAGM OF DIFFERENT LAYERS FOR ELECTROYTIC CELLS

FIELD OF THE INVENTION

The present invention relates to a permeable membrane diaphragm of different layers, especially relates to the permeable membrane diaphragm of different layers for electrolytic cells used in chloro-alkali industry.

PRIOR ART

Diaphragm electrolytic cells are applied in the chloro-alkali industry to electrolyze brine for producing chlorine on the anode and producing caustic alkali and hydrogen on the cathode. The diaphragm in the electrolytic cell separates the cathode from the anode, and permits the electrochemical reactions happen respectively to produce hydrogen or chlorine on the different electrodes. Thus, the two gases can't mix and react with each other to cause the danger of explosion. The electrolytic solution flows from the anodic compartment into the cathodic compartment through the diaphragm by the pressure drop that is formed by the difference between the levels of the anodic solution and the cathodic solution. The diaphragm controls the flow rate of the electrolytic solution by its resistance so that the electrolyte has a normal concentration of caustic alkali. The diaphragm should be stable in the corrosive operation condition, where its one side contacts strong acid in the anodic compartment and the other side contacts caustic alkali in the cathodic compartment. The diaphragm should also have a low electric resistance at operation, and it should restrict the diffusion rate of the caustic alkali from the cathode to the anode. Meanwhile, the diaphragm should hardly be plugged, when the particles of hydroxide are formed in the cathodic compartment.

Diaphragms have been made from asbestos for a long time. However, the lifetime of diaphragm is short because of the low strength of asbestos. Moreover, it is found that asbestos is a cancerogenic substance. So, non-asbestos polymeric diaphragms are being investigated in many places over the world.

Some non-asbestos polymeric diaphragms are developed to imitate the structure of asbestos diaphragm. However, unlike asbestos, the polymeric fibers of these diaphragms do not have much branches and scales on their surfaces, and thus these polymeric fibers can hardly form micro pores. Meanwhile, the polymers are usually hydrophobic. Therefore, the polymeric diaphragms should be additionally treated to form micro-pores and become hydrophilic.

Non-asbestos polymeric diaphragms are usually based on fluoro-containing polymers, while inorganic fillers or organic surfactants are added to turn them hydrophilic. U.S. Pat. No. 4,170,537, U.S. Pat. No. 4,170,538 and U.S. Pat. No. 4,170,539 describe a kind of diaphragm with polymeric matrix. The said diaphragm once contained inorganic fillers of zirconium or magnesium compounds, which were then mostly impregnated and removed by a colloidal dispersion of hydrolyzed perfluorosulfonic acid polymer. The diaphragm is reported to have a certain porosity and hydrophilicity.

U.S. Pat. No. 3,930,979, U.S. Pat. No. 4,250,002, U.S. Pat. No. 4,113,912, U.S. Pat. No. 4,385,150 and U.S. Pat. No. 4,341,614 describe some porous PTFE diaphragms, which are made by the following steps: mixing PTFE powder or fiber with fillers, processing the mixtures into sheets, and then forming pores on the PTFE layer by dissolving off or decomposing the fillers.

The porosity and uniformity of the diaphragms made by the above-said method are regulated by the polymer fibers and the fillers, so the mixture should be well homogenized and the size of fillers must be very uniform. Because the process is very complex, the production cost is very high. Meanwhile, since a large portion of the fillers is removed to provide desired porosity to the diaphragm, the finished diaphragm is inherently weak. To offset this problem, the thickness of the diaphragm is increased and it leads to increase the consumption of the precious micro-porous PTFE. The operation voltage and the consumption of energy are also increased.

U.S. Pat. No. 4,187,390 discloses a diaphragm made of PTFE porous sheet. The porous sheet is made by extending a special PTFE plate at two dimensions at high temperature and adding hydrophilic agents to the sheet to form a permeable sheet. Since the consumption of the precious material PTFE is large and the pores formed thereon do not connect each other, the cost of the diaphragm is high and its resistance will increase rapidly if the diaphragm is plugged.

To prevent the diaphragm being plugged by the hydroxide formed in the cathodic compartment, the pore diameter of the diaphragm on the side toward the cathodic compartment can be larger than the pore diameter on the other side. U.S. Pat. No. 4,863,604 describes a micro-porous asymmetric composite fluorocarbon polymer diaphragm, which is formed by laminating two or more fluorocarbon polymer sheets having different pore sizes. The preparation steps of the diaphragm are as follows: at first, incorporating into PTFE some inorganic solid filler particles, which are applied to form pores on the diaphragm when they are removed from the sheet by leaching or heat decomposition, and thus a sheet of PTFE/pores-forming fillers is obtained; then, forming another sheet of PTFE/pores-forming fillers, where the size of the fillers is larger; bonding the sheets thus formed by hot-pressing and sintering; finally, removing the pores-forming fillers by leaching or heating, and thus forming a micro-porous asymmetric composite fluorocarbon polymer diaphragm. This process also has the above-mentioned disadvantages, that is, it is complicated to control the homogeneity of the mixture and the uniformity of the pores size. Meanwhile, since the fillers, which constitute a large part of the diaphragm structure are removed to provide the porosity, the finished diaphragm is inherently weak. To offset the problem, the finished diaphragm must be undesirably thick.

U.S. Pat. No. 5,183,545 discloses a multi-layer porous EPTFE diaphragm. The diaphragm is made by the following process: extending EPTFE at one or more dimension to form porous EPTFE membrane; bonding at least two layers by hot sintering to form diaphragm, where the at least two layers are of different porous structures and densities. The density difference is over 5%. At least a portion of the interior surface and exterior surface of the EPTFE membrane and its pores are coated with a perfluoro ion exchange polymer. The pore may contain a water-soluble surfactant. Thus an asymmetric multilayer diaphragm with fine structure is formed. The diaphragm is made by bonding plural membranes, where the membranes are made from the same materials. So a lot of precious PTFE is used and thus the cost of the diaphragm is high. Although the diaphragm plugging may be reduced, but the extent of reduction is limited.

OBJECT OF THE INVENTION

The object of the present invention is to overcome the disadvantages of the prior art, such as the diaphragm is of high cost, low strength and easily to be plugged in operation. The present invention provides a permeable membrane diaphragm of different layers for electrolytic cells. The diaphragm of the present invention has an asymmetric structure formed by different layers. The diaphragm has a thin layer with very small pore size on the side near the anode. This layer has low electric resistance and high flow resistance and can prevent insoluble particles entering into the layer. While, the diaphragm has a thick layer with larger pore size on the side near the cathode, so it can discharge the deposition of hydroxide easily without sacrifice its capability of restricting the diffusion of OH— groups from the cathodic compartment to the anodic compartment and at the same time, the thick layer renders higher strength to the diaphragm. The diaphragm of the present invention is more profitable than prior polymer or asbestos diaphragm and can eliminate the pollution of asbestos.

The diaphragm of the present invention can bear an up to 3000 A/$m^2$ and frequently changed current density, and thus increases the productivity and decrease the production cost.

SUMMARY OF THE INVENTION

The present invention provides a permeable membrane diaphragm of different layers for electrolytic cell. The diaphragm is asymmetric and comprises:

a flow-controlling permeable layer, which comprises a thin liquid permeable micro-porous membrane or several thinner similar membranes made of fluoro-containing polymers. This layer is mounted toward the anode;

a diffusion-restricting permeable layer, which comprises a thick permeable perforate film, sheet or cloth, or several thinner similar films, sheets or cloths made of anti-corrosive materials; The mean pore diameter of this layer is at least 5 times larger than that of the flow-controlling permeable layer, and the thickness of this layer is at least 1 times larger than that of the flow-controlling permeable layer. This layer is mounted toward the cathode;

Optionally a protective layer, which comprises one or more liquid permeable film, sheet or cloth made of anti-corrosive materials. This layer covers the micro-porous membrane of the flow-controlling layer to protect it; and Optionally a fluid impermeable frame made of anti-corrosive material. This frame is around the above-said layers.

The permeable membrane diaphragm of different layers of the present invention can be mounted in all the kinds of electrolytic cells;

The said flow-controlling permeable layer is based on fluoro-containing polymers. For example, it can be a PTFE micro-porous membrane made by mixing PTFE powders or fibers with inorganic pore-forming fillers or organic surfactant; also it can be made by extending PTFE plate at high temperature and treating it with a hydrophilic agent.

The pore diameter of the said flow-controlling permeable layer ranges from 0.1–2.0 μm, preferably 0.1–0.5 μm, and the thickness of this layer is 0.03–0.2 mm, preferably 0.07–0.1 mm.

The said diffusion-restricting permeable layer is based on at least one of the following polymers: polypropylene, chlorinated polyvinyl chloride, polyoxymethylene, polyamide, polytetrafluoroethylene and synthetic rubber. Polypropylene is preferred. This layer can be prepared with the well-known method in this art. The pore diameter of this layer is 5–50 μm, preferably 10–20 μm. Its thickness is 0.3–2.0 mm, preferably 0.8–1.2 mm.

The said protective layer can be a layer commonly used in diaphragm electrolytic cells, such as glass cloth. It can strengthen and protect the diaphragm.

The frame usually is a PTFE plate. It prevents fluid leakage and serves for mounting the diaphragm. In the present invention, the said frame may be a part of the electrolytic cell. The connection between the diaphragm and other parts of the electrolytic cell is detachable.

The diaphragm electrolytic cell, which is mounted with a permeable membrane diaphragm of the present invention is applied to electrolyte a solution of sodium chloride. After the solution is fed into the anodic compartment of the diaphragm electrolytic cell, the solution passes through the diaphragm and enters the cathodic compartment. When a direct current is conducted, chlorine is formed in the anodic compartment while hydrogen is formed in the cachodic compartment. Because the size of gas bubbles is much larger than the size of the micro-pores of the diaphragm, different gases can be separated from each other.

When the solution passes through the diaphragm, it passes through the flow-controlling permeable layer first. Because the pores on this layer are very fine, the flow velocity of the solution is controlled within the desired range as described by Poiseuill's formula. Since this layer is very thin, according to Ohm's law, its resistance is low. When the layer is partly plugged, the resistance of the diaphragm will increase only of a small value. In addition, the layer is made of small amount of precious fluoro-containing polymer, so it is less expensive and can be easily turned into hydrophilic membrane.

When the solution passes through the diffusion-restricting permeable layer, the flow velocity needn't to be controlled by this layer. In addition, this layer does not contact the chlorine, so the pores on this layer can be much larger for easily discharging the deposition of hydroxide, which is formed in the cathodic compartment. At the same time, the thickness of this layer is much larger to strengthen the diaphragm. Because the difference of $OH^-$ concentrations between the two sides of the diaphragm is about a constant, so with the thickness of the diaphragm increasing, the graduation of the $OH^-$ ions becomes smaller. According to Fick's law, the diffusion of $OH^-$ ions toward the anodic compartment can be restricted, so $OH^-$ ions rarely react with chlorine. Since this layer does not contacts chlorine and its pore size is much larger, it can be made from cheap materials and by simple processes.

Both the above-said layers may comprise several thinner membranes of similar structure. If the layer comprises more than two membranes, the membranes may be same or different in shapes, areas and mean pore diameters. The membranes may be combined together by means of adhesive, hot pressing or just by simply superposing.

The permeable membrane diaphragm of the present invention can hardly be plugged, and has a longer lifetime, while its production cost and maintenance fee are reduced. The advantages of the diaphragm of the present invention comprise:

1. It is made of non-asbestos materials and the pollution of asbestos is eliminated;

2. Its anticorrosion performance and strength are better than asbestos, so it has a long lifetime in the operation;

3. It keeps a low electric resistance in a long-term operation;

4. Its dimensions are stable in the operation, so the distance between the anode and the cathode can be reduced;

5. It can bear an up to 3000 A/$m^2$ and frequently changed current density, so the productivity can be increased and the production cost can be decreased;

6. It is much cheaper, because the consumption of the precious material PTFE is decreased;

7. It can be mounted on every kind of diaphragm electrolytic cells;

8. It can be produced in a special plant on large scale and the user needn't to add any equipment for the preparation.

Here, 1 indicates the flow-controlling permeable layer (including a protective layer), 2 indicates a frame, 3 indicates the diffusion-restricting permeable layer, 4 indicates the flow-controlling permeable layer without frame (including a protective layer), and 5 indicates a diffusion-restricting permeable layer without frame.

Figure 1:
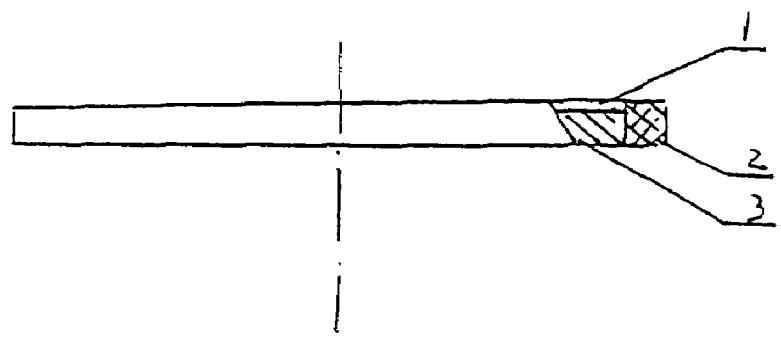
FIG. 1 is a front view and partially sectional view of the permeable membrane diaphragm of different layers of the present invention.
Figure 2:
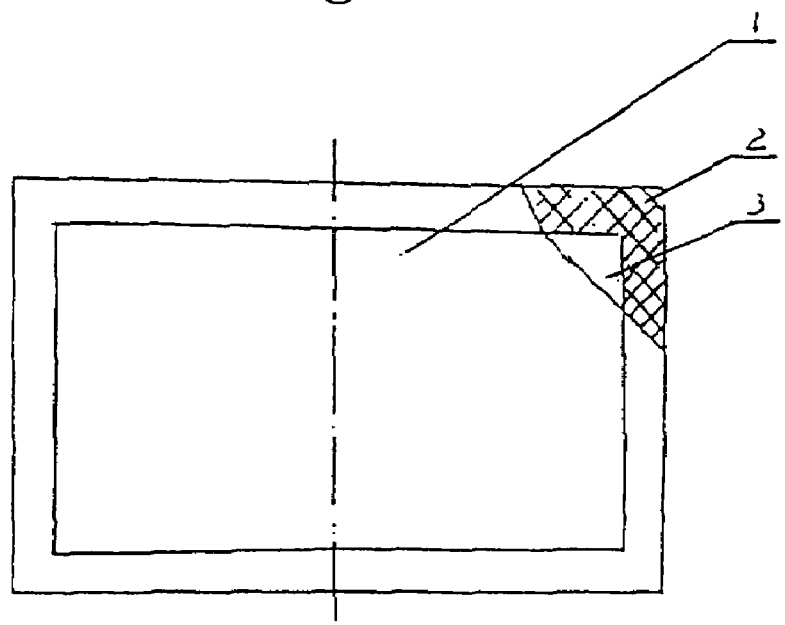
FIG. 2 is a top view and partially sectional view of the permeable membrane diaphragm of different layers of the present invention.
Figure 3:
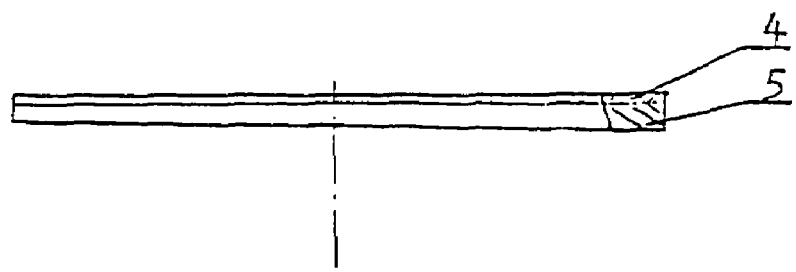
FIG. 3 is a front view and partially sectional view of the permeable membrane diaphragm of the present invention without frame.

The permeable membrane diaphragm of different layers of the present invention is shown in FIG. 1 and FIG. 2. 1 is a micro-porous membrane made of fluoro-containing polymer, which is hydrophilic or has been treated into hydrophilic. This micro-porous membrane is used as the flow-controlling permeable layer. The size and the pore diameter of the membrane are selected as desired. Then, the micro-porous membrane is covered by a protective layer, which is made of anti-corrosive cloth or film and has been treated by a special process. The said flow-controlling permeable layer may be formed by superposing more than one similar thinner membranes. 3 is the diffusion-restricting permeable layer made of one or more thick permeable anticorrosive cloth or perforated sheet. 3 is cut into a suitable size and is covered by 1. 2 is a solid film or sheet made of PTFE or other anticorrosive materials. 2 is around the edges of 1 and 3 and its shape and size are determined by the diaphragm being mounted. 1, 2 and 3 are connected with each other to form a diaphragm.

4 is as same as 1, and 5 is as same as 3. They are applied in the electrolytic cell where frame is not necessary or frame is a part of the electrolytic cell. 5 is covered by 4.

EXAMPLES

Example 1

A PTFE plate was extended at two dimensions and treated with an organic surfactant to make a flow-controlling permeable layer-PTFE hydrophilic micro-porous membrane. It has a mean pore diameter of 0.1 μm and a thickness of 0.1 mm; Then, polypropylene was used as raw material to make a diffusion-restricting permeable layer-polypropylene perforate film. Its mean pore diameter is 12 μm and thickness is 1 mm; Then the polypropylene perforate film was covered by the PTFE hydrophilic micro-porous membrane and a glass cloth was used as a protective layer to cover the surface of the PTFE hydrophilic micro-porous membrane. Finally the above-said membranes were bonded to a PTFE frame with an adhesive to obtain the permeable membrane diaphragm of different layers of the present invention. When the current density was 2000 A/m$^2$, temperature was 95° C., and the concentration of NaOH in the electrolytic solution was 120 kg/m$^3$, the voltage of the diaphragm was 0.10 v.

Example 2

A PTFE hydrophilic micro-porous membrane was made by the same method as described in example 1. Its mean pore diameter is 0.5 μm and thickness is 0.15 mm; a diffusion-restricting permeable layer was made from Nylon 6 with mean pore diameter of 15 μm and thickness of 0.8 mm. When the current density was 2000 A/m$^2$, temperature was 95° C., and the concentration of NaOH in the electrolytic solution was 120 kg/m$^3$, the diaphragm, which contained the above-said layers, had a voltage of 0.08 v.

Example 3

Three PTFE hydrophilic micro-porous membranes were made by the same method as described in example 1. The membranes are in the same size. For each membrane, its thickness is 30 μm and a mean pore diameter is 1.5 μm. The three membranes were hot-pressed together to form the flow-controlling permeable layer; A PTFE perforate film was made from a PTFE plate with mean pore diameter of 8 μm and thickness of 0.4 mm. When the current density was 2000 A/m$^2$, temperature was 95° C., and the concentration of NaOH in the electrolytic solution was 120 kg/m$^3$, the voltage of the diaphragm was 0.10 v.

We claim:

1. A permeable membrane diaphragm of different layers for electrolytic cell, comprising:
    a flow-controlling permeable layer, which comprises a thin liquid permeable micro-porous membrane or several thinner similar membranes made of fluoro-containing polymers; wherein the flow-controlling permeable layer is mounted toward the anode;
    a diffusion-restricting permeable layer, which comprises a thick permeable perforate film, sheet or cloth, or several thinner similar films, sheets or cloths made of anti-corrosive materials which are different from those of the flow-controlling permeable layer; wherein the mean pore diameter of the diffusion-restricting permeable layer is at least 5 times larger than that of the flow-controlling permeable layer, and the thickness of the diffusion-restricting permeable layer is at least 1 times larger than that of the flow-controlling permeable layer; wherein the diffusion-restricting permeable layer is mounted toward the cathode;
    optionally a protective layer, which comprises one or more liquid permeable film, sheet or cloth made of anti-corrosive materials; wherein the protective layer covers the micro-porous membrane of the flow-controlling permeable layer to protect it; and
    optionally a fluid impermeable frame made of anti-corrosive material; wherein the fluid impermeable frame is around the above-said layers.

2. The permeable membrane diaphragm of different layers for electrolytic cell of claim 1, wherein the flow-controlling permeable layer comprises one or more microporous membranes made from hydrophilized polytetrafluoroethylene; wherein the mean pore diameter of the flow-controlling permeable layer is in the range of 0.1–2.0 μm and the thickness of the flow-controlling permeable layer is in the range of 0.03–0.2 mm.

3. The permeable membrane diaphragm of different layers for electrolytic cell of claim 1 or 2, wherein the flow-controlling permeable layer has a mean pore diameter of 0.1–0.5 μm and a thickness of 0.07–0.1 mm.

4. The permeable membrane diaphragm of different layers for electrolytic cell of claim 1, wherein the matrix of the diffusion-restricting permeable layer is selected from the group consisting of polypropylene, chlorinated polyvinyl chloride, polyoxymethylene, polyamide, polytetrafluoroethylene and synthetic rubber.

5. The permeable membrane diaphragm of different layers for electrolytic cell of claim 1, wherein the matrix of the diffusion-restricting permeable layer is polypropylene.

6. The permeable membrane diaphragm of different layers for electrolytic cell of claim 1, wherein the diffusion-restricting layer has a mean pore diameter of 5–50 μm and a thickness of 0.3–2 mm.

7. The permeable membrane diaphragm of different layers for electrolytic cell of claim 1, wherein the diffusion-restricting layer has a mean pore diameter of 10–20 μm and a thickness of 0.8–1.2 mm.

8. The permeable membrane diaphragm of different layers for electrolytic cell of claim 1, wherein the membranes are combined together by means of adhesive, hot pressing or just by simply superposing.

* * * * *

UNITED STATES PATENT AND TRADEMARK OFFICE
CERTIFICATE OF CORRECTION

PATENT NO. : 7,241,367 B1
APPLICATION NO. : 09/889574
DATED : July 10, 2007
INVENTOR(S) : Guocheng Wang It is certified that error appears in the above-identified patent and that said Letters Patent is hereby corrected as shown below:

Title Page and Col. 1 line 1, the title of the invention should read:

--PERMEABLE MEMBRANE DIAPHRAGM OF DIFFERENT LAYERS FOR ELECTROLYTIC CELLS--

Signed and Sealed this

Thirtieth Day of October, 2007

JON W. DUDAS
*Director of the United States Patent and Trademark Office*